(12) United States Patent
Finke et al.

(10) Patent No.: US 7,475,029 B2
(45) Date of Patent: Jan. 6, 2009

(54) COMPUTER IMPLEMENTED METHODS AND COMPUTER READABLE MEDIUMS FOR OPTIMIZING A PURCHASE ORDER

(75) Inventors: Sabine Finke, Karlsruhe (DE); Ramin Bagheri, Schwetzingen (DE); Martina Rothley, Schwetzingen (DE); Klaus Kohlmaier, Leimen (DE)

(73) Assignee: SAP AG, Walldorf (DE)

( * ) Notice: Subject to any disclaimer, the term of this patent is extended or adjusted under 35 U.S.C. 154(b) by 558 days.

(21) Appl. No.: 11/026,028

(22) Filed: Jan. 3, 2005

(65) Prior Publication Data

US 2006/0089885 A1 Apr. 27, 2006

Related U.S. Application Data

(60) Provisional application No. 60/621,337, filed on Oct. 22, 2004.

(51) Int. Cl.
*G06Q 30/00* (2006.01)
*G06F 17/30* (2006.01)

(52) U.S. Cl. .......................... 705/26; 705/27
(58) Field of Classification Search ............. 705/26–27, 705/28–29; 75/1, 26–28
See application file for complete search history.

(56) References Cited

U.S. PATENT DOCUMENTS

2001/0011232 A1* 8/2001 Peterson et al. ............... 705/26
2002/0042755 A1* 4/2002 Kumar et al. ................. 705/26
2002/0116331 A1* 8/2002 Cataline et al. ............... 705/39
2003/0115115 A1* 6/2003 Ouchi .......................... 705/27

OTHER PUBLICATIONS

"E-invasion". Laurent, Anne. Government Executive v32n6 pp. 26-34. Jun. 2000. [recovered from Dialog database on Aug. 27, 2008].*

* cited by examiner

*Primary Examiner*—Jeffrey A. Smith
*Assistant Examiner*—William J. Allen
(74) *Attorney, Agent, or Firm*—Kenyon & Kenyon LLP

(57) ABSTRACT

The present invention provides a system and method for optimizing a purchase order. While generating a purchase order, a purchasing agent may aggregate a company's purchasing requirements into a single purchase order, receive notification of a supplier's offers for discounts to determine whether it would be advantageous to modify a purchase request, or view evaluations of a supplier's past performance. Upon receipt of a purchase request, potential suppliers are identified to fulfill the request. A purchasing agent may then see whether a purchase request may be aggregated with other purchase requests or whether conditions are present that may trigger other opportunities to optimize the purchase order. As a result, a purchase order is generated that has been optimized to reduce costs as well as take advantage of other benefits that the purchaser may be interested in.

16 Claims, 4 Drawing Sheets

COMPUTER IMPLEMENTED METHODS AND COMPUTER READABLE MEDIUMS FOR OPTIMIZING A PURCHASE ORDER This application claims the benefit under 35 USC 119(e) of U.S. provisional application 60/621,337, filed Oct. 22, 2004 and fully incorporated herein by reference.

BACKGROUND

Companies that engage in commercial transactions often communicate to each other using various forms to negotiate terms of their transactions. For example, purchasers who wish to purchase an item may send a purchase order to a supplier. The purchase order may set forth information concerning the desired purchase such as the number of items that are requested, the price, and a requested delivery date. The supplier may respond with a confirmation or with an alternate proposal setting forth items that can be delivered, a price and dates that the supplier is able to deliver these items.

Suppliers who compete for business may be willing to offer incentives for potential purchasers to purchase goods from them. For example, suppliers may offer discounts for bulk-rate purchases or for advanced notice. Suppliers may negotiate terms of purchases with prospective purchasers and set forth these terms in contracts that will govern future purchases from the suppliers. As part of these contracts, suppliers may offer discounted rates if certain conditions are met.

Often purchasers may choose among suppliers because multiple suppliers offer the same items. Purchasers may have significant requirements and may need to submit many purchase orders to obtain items needed for their businesses. Understanding the incentives that suppliers offer to encourage purchases may be a cumbersome task, especially when a company has many purchasing needs. For example, it may be difficult to recall how much of a specific item must be purchased to obtain a discount. Additionally, a business may have multiple departments that desire the same items. Collecting multiple purchasing requests within a company to determine the overall needs of the company may be a burdensome manual task. A purchaser may also be interested in impressions others have had of a supplier's past performance prior to placing an order. Benefits would be obtained from an automated system that would allow a purchaser to combine overall purchasing requirements of a company and take advantage of discounts that the supplier offers, while also considering other aspects of the purchasing decision, such as the past performance of the supplier.

DETAILED DESCRIPTION

The present invention provides a system and method for optimizing a purchase order. While generating a purchase order, a purchasing agent may aggregate a company's purchasing requirements into a single purchase order, receive notification of a supplier's offers for discounts to determine whether it would be advantageous to modify a purchase request, or view evaluations of a supplier's past performance. Upon receipt of a purchase request, potential suppliers are identified to fulfill the request. A purchasing agent may then see whether a purchase request may be aggregated with other purchase requests or whether conditions are present that may trigger other opportunities to optimize the purchase order. As a result, a purchase order is generated that has been optimized to reduce costs as well as take advantage of other benefits that the purchaser may be interested in.

Figure 1:
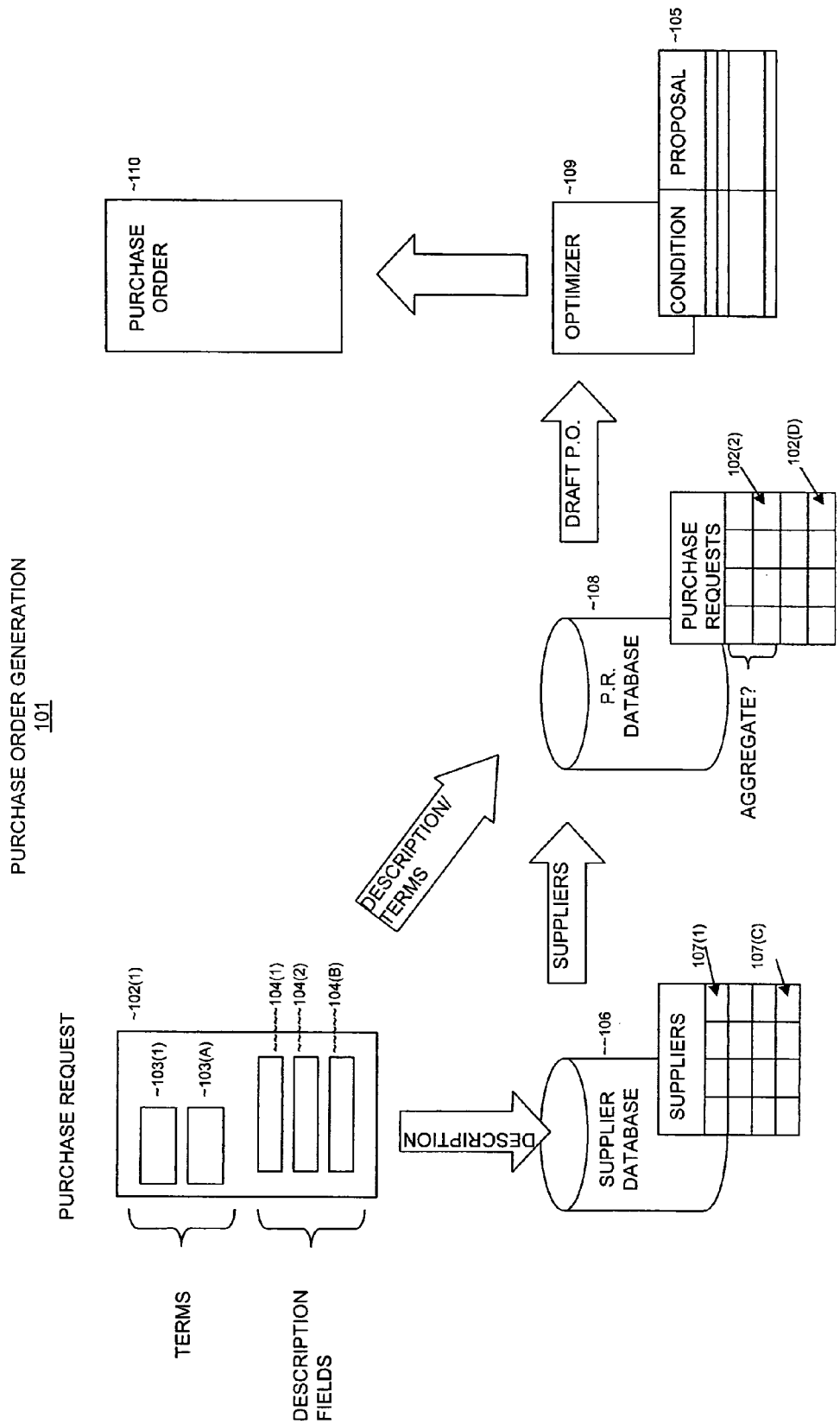
FIG. 1 depicts purchase order generation according to one embodiment of the invention.

FIG. 1 depicts purchase order generation 101 according to one embodiment of the invention. Purchase order generation 101 may process an incoming purchase request 102 by suggesting potential suppliers that could be used to supply the desire goods. Additionally, suggestions may be provided for aggregating purchase requests 102(1)-102(D) and for modifying aggregated purchase requests for further optimization.

A purchase request 102 may include terms 103(1)-103(A) and description fields 104(1)-104(B) that may be used to process the incoming purchase request 102. Terms 103(1)-103(A) may describe the conditions that the purchasers would like the supplier to adhere to. Exemplary terms may include a delivery date, a delivery location, whether substitutions may be provided, penalties for failure to provide the desired items on an agreed date, as well as any other conditions that a purchaser may want to impose on a purchase agreement with the supplier. Description fields 104(1)-104(B) describe the purchase. If the purchase is for goods, description fields 104(1)-104(B) may describe the items or materials that would be purchased including a physical description of the item or materials, performance capabilities of the item or materials and any other information that characterizes the goods. If the purchase is for services, description fields 104(1)-104(B) may provide an explanation of what services are desired.

Data retrieved from description fields 104(1)-104(B) of purchase request 102 may be sent in a query to supplier database 106 to identify a supplier that can provide the requested purchase. Supplier database 106 stores supplier information 107(1)-107(C) that indicates the goods or services that each supplier may provide. Supplier database 106 may be any set of one or more files that stores supplier information 107(1)-107(C) in a machine-readable medium. For example, supplier database may be a look-up table that stores the name of the supplier, goods or services provided by the supplier, and any other information that may be pertinent to the assignment of a supplier to a purchase order 110. A search may be performed in supplier database 106 to identify potential suppliers that provide the desired purchase(s) as they are described by description fields 104(1)-104(B). An exemplary supplier database is shown below.

| Supplier Name | Supplier Address | Goods Supplied | Cost | Discount? |
|---|---|---|---|---|
| ABC Inc. | 12 Dale Road | Cast Iron | 30 USD*/10 Kg | Over 250 Kg - 25 USD/10 Kg |
| XYZ Inc. | 30 Jones Way | Cast Iron | 40 USD/15 Kg | Over 300 Kg - 20 USD/10 Kg |
| XYZ Inc. | 30 Jones Way | Spiral Casing | 30 USD/10 pcs** | Over 100 pcs - 20 USD/10 pcs |

*USD is U.S. Dollars.
**pcs is pieces.

After potential suppliers have been identified, a purchase administrator may be able to view purchase requests 102(1)-102(D) to determine whether multiple purchase requests 102

(1)-102(D) may be aggregated. A purchase administrator may be able to obtain a view of overall purchase needs of the company and may be able to obtain discounted rates or other benefits as a result. Incoming purchase requests 102(1)-102(D) may be stored by a purchase request database 108 so that they may be collected and aggregated when appropriate. A purchase administrator may search purchase requests 102(2)-102(D) using one or more description fields 104(1)-104(B) and/or may search by supplier information 107(1)-107(C) to identify those of purchase requests 102(1)-102(D) that may be aggregated. The purchase administrator may also consider terms 103(1)-103(A) of each of the purchase requests 102(1)-102(D). For example, a purchase administrator may consider requested delivery dates and delivery addresses when identifying whether any of purchase requests 102(1)-102(D) may be aggregated. A purchase administrator may modify delivery dates and/or delivery addresses to take advantage of opportunities to aggregate some of purchase requests 102(1)-102(D). Thus, purchase order 110 may cover purchases requested by multiple purchase requests 102(1)-102(D) thereby improving the likelihood that the purchaser may obtain discounted rates for bulk purchases and also easing the administration between the purchaser and the supplier. Below is an example purchase order database 108 according to one embodiment of the invention.

| Purchase Request No. | Description | Performance | Demand Date | Quantity | Shipment Address |
|---|---|---|---|---|---|
| 1 | Cast Iron | Superior | Oct. 30, 2004 | 170 Kg | Plant 1 |
| 2 | Spiral Casing | Moderate | Nov. 15, 2004 | 234 pieces | Plant 2 |
| 3 | Cast Iron | Superior | Nov. 6, 2004 | 90 Kg | Plant 1 |

A purchase administrator may be able to further optimize purchase order 110, regardless of whether purchase order 110 represents an aggregation of some of purchase requests 102(1)-102(D). Optimizer 109 may store a rules set 105 comprising an array of conditions and proposals that triggers optimization rules when certain conditions are met. For example, optimizer 109 may check to see if the quantity of items requested in purchase order 110 is within a range of a bulk-rate quantity that is discounted. If so, the purchase administrator may receive a system proposal indicating that some additional items may be added to receive a discounted price. In addition to providing the number of additional items to be ordered to obtain the discount, the system may also provide the cost of storing the items so that the purchase administrator can determine whether an actual savings would be realized from adding to the purchase order 110. An exemplary rule set 105 is shown below.

| Condition | Proposal | Rule |
|---|---|---|
| 200-249 Kg of Cast Iron requested. | Ask if purchaser would like 250 Kg of Cast Iron to receive a discount of 25 USD/10 Kg. Let the purchase know that the storage cost is $1 per day. | Increase the quantity of Cast Iron to 250 Kg. |
| 80-99 pcs of Spiral Casing requested. | Ask if purchaser would like 100 pieces of spiral casing to receive a discount of 20 USD/10 pcs. | Increase the quantity of Spiral Casings to 100 pieces. |
| 280-299 Kg of Cast Iron requested. | Ask if purchaser would like 300 Kg of Cast Iron to receive a discount of 20 USD/10 Kg. Let the purchase know that the storage cost is $1 per day. | Increase the quantity of Cast Iron to 300 Kg. |

Optimizer 109 may provide information about suppliers to allow a purchase administrator to choose the best supplier. For example, the purchaser may have contracts with some of the suppliers that may provide the desired goods or services. The optimizer may notify the purchase administrator of a contract with suppliers and describe the terms of the contract so that the purchaser can decide whether it would be beneficial to purchase items in accordance with the terms of one of the contracts. Optimizer 109 may also provide other information that allows purchase administrator to compare suppliers such as discounts offered, schedules for delivery, costs, as well as evaluation information describing how suppliers performed in past deliveries e.g., whether schedules were met and goods were of a high quality. When optimization has been fully explored, if a supplier has not already been assigned, the purchase administrator may assign a supplier that appears to provide the most benefits to the purchaser.

Figure 2:
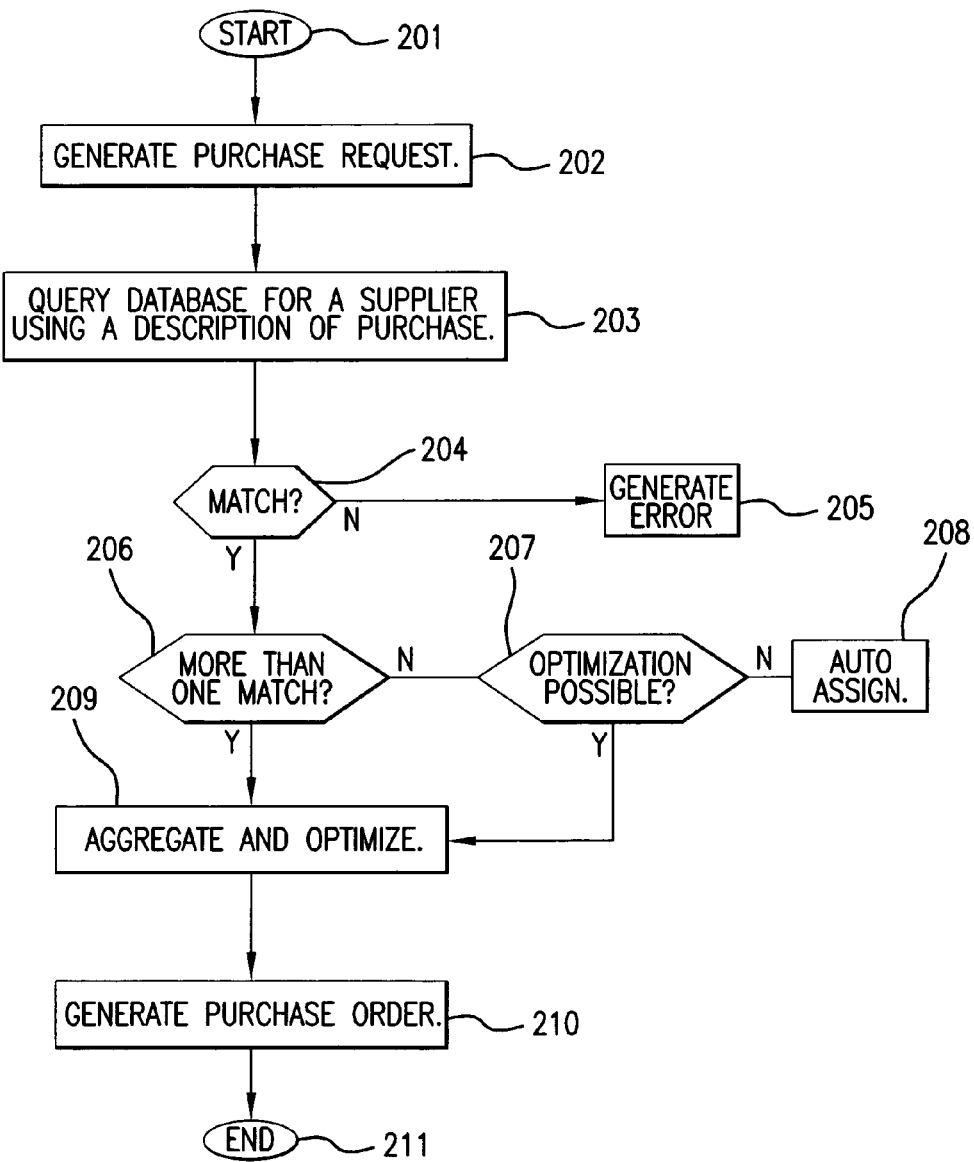
FIG. 2 shows a purchase order generation process according to one embodiment of the invention.

FIG. 2 shows a purchase order generation process according to one embodiment of the invention. Purchase order generation process allows a purchase administrator to generate an optimized purchase order 110.

In step 202, a purchase request 102 is generated. A purchase request 102 may be generated by a warehouse clerk, an administrator or any other individual within a company that becomes aware of the need for the purchase of goods or services. A purchase request 102 may be generated using an internal system for generating and tracking purchase requests 102(1)-102(D).

In step 203, a query is sent to a supplier database 106 including a description of the purchase. For example, if purchase request 102 is for cast iron, a query 105 is sent to supplier database 106 indicating that cast iron is needed to identify any suppliers that provide cast iron. If description fields 104(1)-104(C) comprise a description of the performance characteristics of the desired item, such as superior performance, good performance, moderate performance, the query may also comprise this performance description.

In step 204, a search is performed in supplier database 106 to determine if any suppliers provide the goods requested in purchase request 102. In the example set forth above, supplier database 106 would return both ABC Inc. and XYZ Inc. as suppliers of cast iron. If no supplier is identified, an error is generated, as is reflected by step 205 and the purchase request 102 is processed manually.

Step 206 is reached if a match is found. In step 206, a determination is made of whether more than one match is found. If only one match is found, processing continues to step 207, in which a determination is made of whether optimization is possible. A check is made to determine if any suppliers offer discounts for bulk purchases. In discounts are offered, optimization may be possible by aggregating purchase requests 102(1)-102(D) and/or increasing the amount of a good or service that is purchased. If optimization is not possible, the supplier is automatically assigned and a purchase order is generated as is reflected by step 208. In an alternate embodiment of the invention, a check may be made by querying purchase order database 108 to determine if any other of purchase requests 102(1)-102(D) request the same goods or services even if no discount rate is available for bulk purchases. Aggregation may be done although no discount is obtained to ease the administrative burden on the purchaser and supplier.

Step 209 is reached if more than one match is found and/or optimization is possible. In step 209, purchase requests are aggregated and/or optimized. A purchase administrator reviews incoming purchase requests and determines whether some of purchase requests 102(1)-102(D) can be aggregated. A purchaser may select some of purchase requests 102(1)-102(D) that meet criteria for aggregation and choose an option to aggregate these requests. Criteria for aggregation may be that the request be for the purchase of the same goods or services. Additionally, a delivery date and/or delivery address may be considered when determining whether to aggregate some of purchase requests 102(1)-102(D).

In step 209, conditions may be checked which may trigger processing of optimization rules. This may be done by processing a rule set 105 comprising conditions and proposals. Exemplary conditions include determining whether a purchase order is within a range of a discount. In the examples provided above, if a line item of a purchase order is for 200 Kg-249 Kg of cast iron, optimizer 109 may query the purchase administrator whether an increase in to 250 Kg of case iron may be desirable. The purchase administrator may be informed that the cost of storage of the cast iron is $1 per day. If the purchase administrator selects to optimize the line item, this may trigger a rule that increase the quantity of cast iron to be increased to 250 Kg. Various other conditions may be checked and any optimization rules that are triggered may be processed to offer a purchase administrator the opportunity to optimize the purchase order.

A condition may also be whether a certain supplier has been identified. For example, one condition may be to determine whether XYZ Inc. has been specified as the supplier. The purchaser may have a contract with XYZ Inc. that offers the purchaser certain benefits, such as additional discounts, speedy delivery, or other services. Another condition may be to check to determine whether ABC Inc. has been specified as the supplier. If ABC Inc. has been specified as the supplier, a rule may be triggered to notify the purchase administrator that ABC Inc. has performed poorly in the past by delivery faulty goods or failing to deliver goods on time.

In an alternate embodiment of the invention, a purchase administrator may be able to view characteristics of various suppliers by searching supplier database 106 rather than being notified of these characteristics by the triggering of optimization rules.

Figure 3:
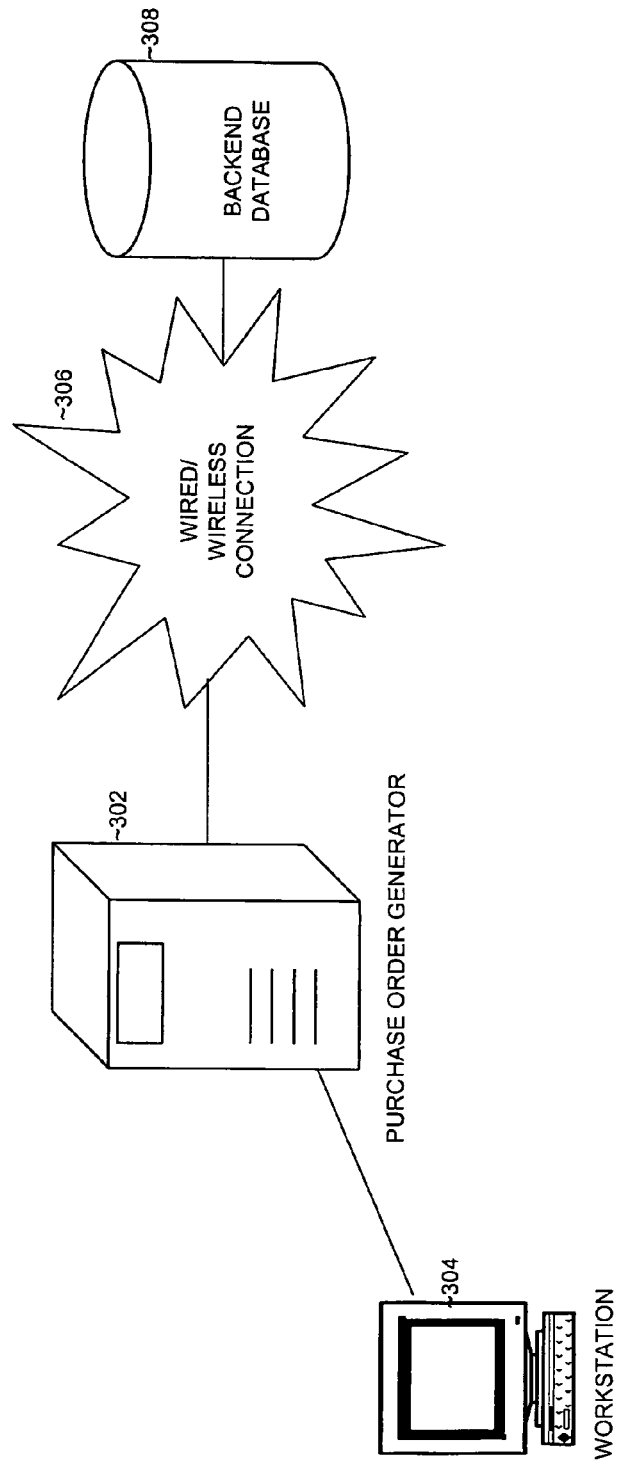
FIG. 3 illustrates a purchase order processing network according to one embodiment of the invention.

FIG. 3 illustrates a purchase order processing network according to one embodiment of the invention. Purchase order processing network 300 may comprise a purchase order generator 302 that processes incoming purchase requests 102(1)-102(D) and generates purchase order 110. Purchase order generator 302 may be connected to workstation 304 so that a purchase order administrator may view a graphical user interfaces providing information about suppliers, other purchase requests and optimization possibilities. Purchase order generator 302 may also be connected to backend database 308 via wired/wireless connection 306. Any of supplier database 106, purchase request database 108 and/or rule set 105 may be stored locally on purchase order generator 302 or on backend database 308.

Workstation 304 may be used to view user interfaces providing information to make decisions regarding aggregation purchase requests 102(1)-102(D) and optimization of purchase order 110. Workstation 304 may be any programmable processor connected to a machine-readable medium that can provide a user interface such as a computer having a graphical user interface (GUI), a phone, or a personal data assistant. Such devices may comprise an output device that can provide to a user any form of sensory feedback such as voice, auditory or tactile (e.g., liquid crystal display (LCD), cathode ray tube (CRT), or earpiece) and an input device providing any form of input to the computer including acoustic, speech, or tactile input (e.g., keyboard, mouse, trackball, keypad).

Backend database 308 may be any data stored on any machine-readable medium including any computer program product, apparatus and/or device (e.g., a random access memory (RAM), read only memory (ROM), magnetic disk, optical disk, programmable logic device (PLD), tape or any combination of these devices). Backend database 308 may be stored according to any file format that may be used to organize data, including HTML file format.

Figure 4:
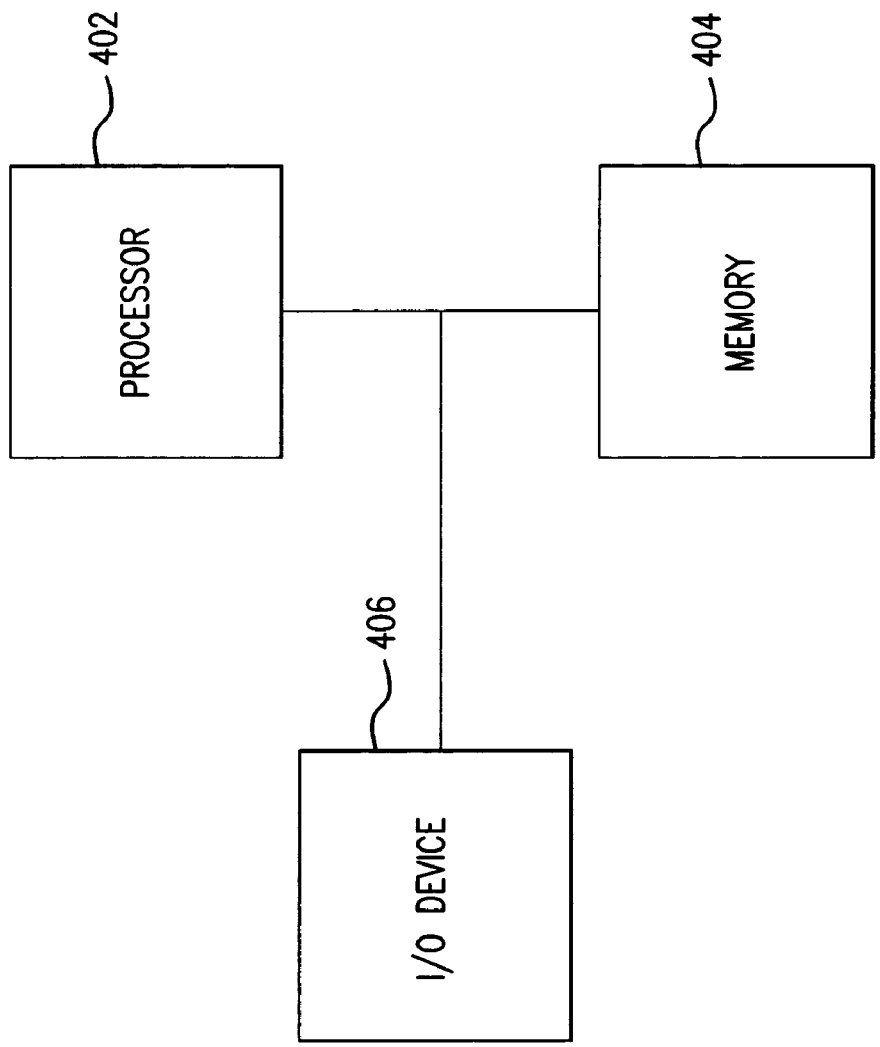
FIG. 4 illustrates a purchase order generator according to one embodiment of the invention.

FIG. 4 illustrates a purchase order generator according to one embodiment of the invention. Purchase order generator 302 includes processor 402, memory 404, and I/O device 406. Processor 402 is connected to memory 404. Processor 402 is also connected to I/O device 406. These connections are direct or via other internal electronic circuitry or components.

Processor 402 may be any programmable processor that executes instructions residing in memory 404 to receive and send data via I/O device 406 including any programmable microprocessor or combination of microprocessors or processors that can operate on digital data, which may be special or general purpose processors coupled to receive data and instructions from, and to transmit data and instructions to, a machine-readable medium. According to one embodiment of the present invention processor 402 is an Intel microprocessor.

Memory 404 may be any machine-readable medium that stores data that is processed by processor 402 including any computer program product, apparatus and/or device (e.g., a random access memory (RAM), read only memory (ROM), magnetic disc, optical disc, programmable logic device (PLD), tape, or any combination of these devices). This may include external machine-readable mediums that are connected to processor 402 via I/O device 406. I/O device 406 may be any coupling that can be used to receive and/or send digital data to and from an external device.

Various implementations of the systems and techniques described here can be realized in any processing systems and/or digital electronic circuitry, integrated circuitry, specially designed ASICs (application specific integrated circuits), computer hardware, firmware, software, and/or combinations thereof.

A number of embodiments of the invention have been described. Nevertheless, it will be understood that various modifications may be made without departing from the spirit and scope of the invention.

What is claimed is:

1. A computer implemented method for optimizing a purchase order that is generated comprising:

upon receipt of requests for purchases, identifying one or more suppliers to supply the purchases using a description received in each of the purchase requests;

aggregating some of the purchase requests into a purchase order using the description received in each of the purchase requests, wherein at least one of the purchase requests is modified for aggregation;

comparing purchase order line items against a rule set including conditions and proposals;

responsive to a match for a respective line item, querying an order administrator at the order administrator workstation with a proposal corresponding to the match, wherein the proposal comprises storage costs associated with a respective item; and upon receipt of a response from the order administrator at the order administrator workstation, modifying the respective line item according to an optimization rule triggered by the proposal selected by the operator.

2. The method of claim 1, wherein at least one of the conditions is whether a quantity of goods is within a range of a bulk quantity that is offered at a discounted cost.

3. The method of claim 1, wherein the optimization rule when triggered sets a quantity of goods included in at least one of the purchase order line items to a bulk quantity that is offered at a discounted rate.

4. The method of claim 1, wherein the proposal further comprises a bulk quantity of goods that is offered at a discounted cost.

5. The method of claim 1, further comprising:
displaying supplier evaluation information to an operator.

6. A computer implemented method for optimizing a purchase order that is generated comprising:

generating a purchase order utilizing a purchase order generator from one or more requests for purchases, wherein a term of one purchase request is modified for the purchase request to be aggregated in the purchase order;

comparing purchase order line items against a rule set including conditions and proposals;

responsive to a match for a respective line item, querying an order administrator at the order administrator workstation with a proposal corresponding to the match, wherein the proposal comprises storage costs associated with a respective item; and upon receipt of a response from the order administrator at the order administrator workstation, modifying the respective line item according to an optimization rule triggered by the proposal selected by the operator.

7. The method of claim 6, further comprising:
displaying suppliers to an operator for assignment of one of said suppliers to the purchase order.

8. The method of claim 7, wherein the display comprises supplier evaluation information, the supplier evaluation information comprises past performances of the suppliers.

9. The method of claim 6, wherein the conditions comprise a range of order for a discount, an existing contract with a supplier, and past poor performance by a supplier.

10. A computer readable medium storing thereon program instructions that, when executed, cause an executing device to:

upon receipt of requests for purchases, identify one or more suppliers to supply the purchases using a description received in each of the purchase requests;

aggregate some of the purchase requests into a purchase order using the description received in each of the purchase requests, wherein at least one of the purchase requests is modified for aggregation;

compare purchase order line items against a rule set including conditions and proposals;

responsive to a match for a respective line item, query an operator with a proposal corresponding to the match, wherein the proposal comprises storage costs associated with a respective item; and upon receipt of a response from the operator, modify the respective line item according to an optimization rule triggered by the proposal selected by the operator.

11. The computer readable medium of claim 10, wherein at least one of the conditions is whether a quantity of goods is within a range of a bulk quantity that is offered at a discounted cost.

12. The computer readable medium of claim 10, wherein the optimization rule when triggered sets a quantity of goods included in at least one of the purchase order line items to a bulk quantity that is offered at a discounted rate.

13. The computer readable medium of claim 10, wherein the proposal further comprises a bulk quantity of goods that is offered at a discounted cost.

14. The computer readable medium of claim 10 further comprising instructions that cause the executing device to display supplier evaluation information to an operator, the supplier evaluation information comprises past performances of potential suppliers.

15. A computer readable medium storing thereon program instructions that, when executed, cause an executing device to:

generate a purchase order from one or more requests for purchases, wherein a term of one purchase request is modified for the purchase request to be aggregated in the purchase order;

compare purchase order line items against a rule set including conditions and proposals;

responsive to a match for a respective line item, querying an operator with a proposal corresponding to the match, wherein the proposal comprises storage costs associated with a respective item; and upon receipt of a response from the operator, modify the respective line item according to an optimization rule triggered by the proposal selected by the operator.

16. The computer readable medium of claim 15, further comprising instructions that cause the executing device to display suppliers to an operator for assignment of one of said suppliers to the purchase order.

* * * * *